US009429324B2

(12) United States Patent
Matsuyama et al.

(10) Patent No.: US 9,429,324 B2
(45) Date of Patent: Aug. 30, 2016

(54) FUEL INJECTOR WITH RADIAL AND AXIAL AIR INFLOW

(75) Inventors: Ryusuke Matsuyama, Akashi (JP); Masayoshi Kobayashi, Kobe (JP); Takeo Oda, Kobe (JP); Atsushi Horikawa, Akashi (JP); Shigeru Hayashi, Chofu (JP); Kazuo Shimodaira, Chofu (JP); Kazuaki Matsuura, Chofu (JP); Hideshi Yamada, Chofu (JP); Youji Kurosawa, Chofu (JP); Hitoshi Fujiwara, Chofu (JP)

(73) Assignees: Kawasaki Jukogyo Kabushiki Kaisha, Kobe-shi (JP); Japan Aerospace Exploration Agency, Chofu-shi (JP)

( * ) Notice: Subject to any disclaimer, the term of this patent is extended or adjusted under 35 U.S.C. 154(b) by 1026 days.

(21) Appl. No.: 13/485,383

(22) Filed: May 31, 2012

(65) Prior Publication Data

US 2012/0304649 A1 Dec. 6, 2012

(30) Foreign Application Priority Data

Jun. 3, 2011 (JP) ................ 2011-125480

(51) Int. Cl.
*F23R 3/14* (2006.01)
*F23R 3/28* (2006.01)

(52) U.S. Cl.
CPC .............. *F23R 3/14* (2013.01); *F23R 3/286* (2013.01); *Y02T 50/675* (2013.01)

(58) Field of Classification Search
CPC .......... F23R 3/14; F23R 3/286; F23R 3/346; Y02T 50/675
See application file for complete search history.

(56) References Cited

U.S. PATENT DOCUMENTS 3,917,173 A * 11/1975 Singh ............................. 239/400
6,272,840 B1 8/2001 Crocker et al.
(Continued)

FOREIGN PATENT DOCUMENTS

EP 0478305 A2 4/1992
EP 2716976 A1 4/2014
(Continued)

OTHER PUBLICATIONS

ISA European Patent Office, Extended European Search Report Issued in Application No. 12170538.8, Nov. 4, 2014, Germany, 5 pages.
(Continued)

*Primary Examiner* — Carlos A Rivera
(74) *Attorney, Agent, or Firm* — Alleman Hall McCoy Russell & Tuttle LLP

(57) ABSTRACT

A fuel injector includes: a pilot injector configured to spray fuel so as to form a first combustion region in a combustion chamber; and a main injector provided coaxially with the pilot injector so as to surround the pilot injector and configured to supply a fuel-air mixture that is a mixture of the fuel and air to form a second combustion region in the combustion chamber, wherein the main injector includes: a first inflow channel through which the air having a major flow component in an axial direction is taken; a second inflow channel through which the air having a major flow component in a radial direction is taken and which causes the air therein to meet the air from the first inflow channel; and a main fuel injecting portion configured to inject the fuel only to the second inflow channel.

10 Claims, 11 Drawing Sheets

(56) References Cited

U.S. PATENT DOCUMENTS

| | | | |
|---|---|---|---|
| 6,354,072 B1 * | 3/2002 | Hura | 60/776 |
| 6,363,726 B1 * | 4/2002 | Durbin et al. | 60/748 |
| 6,381,964 B1 * | 5/2002 | Pritchard et al. | 60/746 |
| 6,389,815 B1 | 5/2002 | Hura et al. | |
| 6,453,660 B1 * | 9/2002 | Johnson et al. | 60/39.821 |
| 7,565,803 B2 * | 7/2009 | Li | F23R 3/14 60/748 |
| 7,596,949 B2 * | 10/2009 | DeVane et al. | 60/748 |
| 8,312,724 B2 * | 11/2012 | Dai | F23R 3/14 60/737 |
| 8,973,368 B2 * | 3/2015 | Dai | F23C 7/004 60/734 |
| 2002/0011064 A1 * | 1/2002 | Crocker et al. | 60/39.06 |
| 2004/0079086 A1 * | 4/2004 | Smith et al. | 60/776 |
| 2005/0028526 A1 | 2/2005 | Von Der Bank | |
| 2005/0097889 A1 | 5/2005 | Pilatis et al. | |
| 2006/0021350 A1 * | 2/2006 | Sanders | 60/743 |
| 2007/0028624 A1 | 2/2007 | Hsieh et al. | |
| 2007/0137207 A1 | 6/2007 | Mancini et al. | |
| 2008/0236165 A1 * | 10/2008 | Baudoin et al. | 60/746 |
| 2009/0255259 A1 * | 10/2009 | Kastrup | B23P 6/007 60/737 |
| 2010/0287946 A1 | 11/2010 | Buelow et al. | |
| 2010/0308135 A1 | 12/2010 | Yamamoto et al. | |
| 2011/0016868 A1 | 1/2011 | Oda et al. | |
| 2011/0089264 A1 | 4/2011 | Thomson et al. | |
| 2012/0234013 A1 | 9/2012 | Overman et al. | |

FOREIGN PATENT DOCUMENTS

| | | |
|---|---|---|
| JP | H04136603 A | 5/1992 |
| JP | 07217451 A | 8/1995 |
| JP | 2002323221 A | 11/2002 |
| JP | A-2003-262337 | 9/2003 |
| JP | 2004226051 A | 8/2004 |
| JP | 2007162998 A | 6/2007 |
| JP | 2010255944 A | 11/2010 |
| JP | 2011007477 A | 1/2011 |

OTHER PUBLICATIONS

European Patent Office, Extended European Search Report of EP12170535.4, Germany, Nov. 3, 2014, 5 pages.

* cited by examiner

FUEL INJECTOR WITH RADIAL AND AXIAL AIR INFLOW

BACKGROUND OF THE INVENTION

1. Field of the Invention

The present invention relates to a fuel injector used in, for example, a gas turbine engine and including a combined fuel injector configured by combining a plurality of fuel nozzles, and particularly to a main injector of the fuel injector.

2. Description of the Related Art

In recent years, in consideration of the environment, there is a need for a reduction of NOx (nitrogen oxide) emitted from gas turbine engines. The NOx to be emitted from the gas turbine engine is generated mainly by oxidization of nitrogen in inflow air when fuel is supplied to the inflow air and combusted at high temperature. Meanwhile, the amount of CO2 emission of the gas turbine engine, that is, fuel consumption decreases as an exhaust gas at an exit of a combustor increases in temperature. Therefore, to reduce the CO2, the fuel needs to be combusted at high temperature by increasing a fuel-air ratio. According to a fuel nozzle of a combustor of a conventional gas turbine engine, the fuel is directly sprayed to a combustion chamber without premixing the fuel with the air. Therefore, before the fuel is adequately mixed with the air, the fuel combusts, and regions where a flame temperature is significantly higher than an average value are generated locally. The amount of NOx generation increases exponentially with the flame temperature. Therefore, a large amount of NOx is generated from the local regions where the flame temperature is high. On this account, according to the conventional combustion method, when the temperature of the exhaust gas at the exit of the combustor is increased, the amount of NOx emission increases sharply.

To reduce the local regions where the flame temperature is high, a lean premix combustion method is effective. According to this method, the fuel and the air are premixed, and a fuel-air mixture in which the fuel in the form of a mist is dispersed in the air is supplied to the combustion chamber and combusted therein. Meanwhile, according to the lean premix combustion method, in a case where the output of the gas turbine engine is low and the fuel-air ratio is low, the flame is unstable and incomplete combustion tends to occur as compared to a case where the fuel is directly sprayed to the combustion chamber. Here, a concentric fuel injector has been devised. This fuel injector is configured such that a pilot injector and a main injector provided outside the pilot injector are provided coaxially. When the output of the gas turbine engine is low, the fuel is directly sprayed from only the pilot injector to the combustion chamber to maintain stable combustion. When the output of the gas turbine engine is intermediate or high, that is, when the amount of NOx emission is large, the amount of fuel injected directly from the pilot injector is reduced, and a pre-mixture generated by the main injector is also injected to the combustion chamber. With this, the amount of NOx emission is reduced. Regarding a gas turbine engine for aircrafts, the output of the gas turbine engine is substantially low (lower than about 40% of the rated output) in a state of each of ground idle, flight idle, and approach, the output of the gas turbine engine is substantially intermediate (about 40 to 80% of the rated output) in a cruising state, and the output of the gas turbine engine is substantially high (about 80 to 100% of the rated output) in a state of each of climb and takeoff.

According to the concentric fuel injector, the temperature of the gas at an entrance of the combustor and the fuel-air ratio when the output of the gas turbine engine is intermediate are respectively lower than those when the output of the gas turbine engine is high, and the flame temperature when a main pre-mixture is combusted is low. Therefore, although the amount of NOx emission is generally not so large, the main pre-mixture tends to cause the incomplete combustion, and the combustion efficiency tends to be low. On this account, when the output of the gas turbine engine is intermediate, flame holding of the main pre-mixture by combustion flame of the pilot injector becomes important. Meanwhile, when the output of the gas turbine engine is high, the flame temperature is adequately high, so that the flame stabilizes only by the main pre-mixture, and the combustion efficiency has no problem. However, the amount of NOx emission tends to be large. Therefore, uniformization of the main pre-mixture needs to be further considered. To maintain satisfactory performance when the output of the gas turbine engine is intermediate or high, a fuel injector has been proposed, in which: two air channels through which air inflows in a radial direction are formed on the main injector; and fuel injection holes corresponding to one fuel supply system are formed on each air channel, that is, the fuel injection holes corresponding to each of two fuel supply systems are formed (see Japanese Laid-Open Patent Application Publication No. 2003-262337). According to this fuel injector, when the output of the gas turbine engine is intermediate, the fuel is injected only to one air channel through which the pre-mixture is supplied to a position closer to the pilot injector. With this, the flame holding of the pre-mixture by the combustion flame of the pilot injector is promoted, and this improves the combustion efficiency. Meanwhile, when the output of the gas turbine engine is high, the fuel is injected to both air channels, and the pre-mixture is generated more uniformly. Thus, the NOx emission is suppressed.

According to the fuel injector of Japanese Laid-Open Patent Application Publication No. 2003-262337, since the fuel is injected to the two air channels, the fuel injection holes corresponding to each of the two fuel supply systems are formed. Forming the fuel injection holes corresponding to each of a plurality of fuel supply systems as above increases structural complexity of the fuel injector. Generally, according to the concentric fuel injector, when the output of the gas turbine engine is low, the fuel flows only to the pilot injector, and the fuel in a fuel channel in the main injector stays therein. The staying fuel causes carbonization (coking) at a certain temperature or higher and accumulates on a wall surface of the fuel channel to close the fuel channel. As a countermeasure against this problem, in the main injector, a cooling structure for preventing the coking needs to be provided for each of the fuel supply systems of the fuel injection holes. However, providing the cooling structures respectively for the plurality of fuel supply systems of the fuel injection holes within a limited space in the main injector extremely increases the structural complexity of the main injector. Moreover, in a case where the fuel injection holes to be used are switched in accordance with the output, a control mechanism is required, and it is extremely difficult to secure reliability for ensuring appropriate selection of the fuel injection holes in any scene.

SUMMARY OF THE INVENTION

The present invention addresses the above described conditions, and an object of the present invention is to provide a fuel injector capable of realizing the NOx reduction by adequately mixing the air and the fuel when the output of the gas turbine engine is intermediate or high, that is, when the main injector is operating, without increasing the complexity of devices and control mechanisms.

To achieve the above object, a fuel injector according to the present invention includes: a pilot injector configured to spray fuel so as to form a first combustion region in a combustion chamber; and a main injector provided coaxially with the pilot injector so as to surround the pilot injector and configured to supply a fuel-air mixture that is a mixture of the fuel and air to form a second combustion region in the combustion chamber, wherein the main injector includes: a first inflow channel configured to take the air therethrough and give the air a major flow component in an axial direction; a second inflow channel configured to take the air therethrough, give the air a major flow component in a radial direction, and cause the air therein to meet the air from the first inflow channel; and a main fuel injecting portion configured to inject the fuel only to the second inflow channel. Here, the air having the major flow component in the axial direction may include a small flow component in a radial direction or a circumferential direction. The air having the major component in the radial direction may include a small flow component in the axial direction or the circumferential direction.

According to this configuration, the air of the first inflow channel and the fuel-air mixture of the second inflow channel meets at a certain angle. Therefore, after the air and the fuel-air mixture meet, the air and the fuel are adequately mixed with each other in a comparatively short distance. Thus, the NOx reduction can be realized when the output of the gas turbine engine is intermediate or high, that is, when the main injector is operating. In addition, since the fuel is injected only to the second inflow channel, a fuel channel and its cooling structure can be simplified.

In the present invention, it is preferable that the main injection vale inject the fuel to the second inflow channel from the main fuel injecting portion provided at a portion which defines a boundary between the first inflow channel and the second inflow channel. According to this configuration, when the output of the gas turbine engine is intermediate, that is, when the momentum of the injection of the main fuel is small, the injected fuel just reaches a region close to the inject holes, as compared to when the output of the gas turbine engine is high, that is, when the momentum thereof is large. As a result, the fuel is injected mainly to a position close to the main fuel injecting portion in the air flow of the second inflow channel. Therefore, when the air flow of the second inflow channel meets the air flow of the first inflow channel to be changed to the air flow in the axial direction and is then injected to the combustion chamber, the fuel in the form of a mist flows on a radially inward side as compared to when the output of the gas turbine engine is high. To be specific, when the output of the gas turbine engine is intermediate, the main fuel in the form of a mist gets close to the first combustion region where the combustion state is stable, as compared to when the output of the gas turbine engine is high. As a result, the flame holding effect by the flame in the first combustion region can be easily obtained at the time of combustion. Thus, the combustion efficiency improves. Moreover, the portion which defines a boundary between the first inflow channel and the second inflow channel can generally secure a space widely in many cases. Therefore, a structure, such as a cooling structure for preventing coking, in the main fuel injecting portion can be easily, spatially arranged.

In the present invention, it is preferable that: a first swirling unit and a second swirling unit be respectively attached to an entrance of the first inflow channel and an entrance of the second inflow channel; and the second swirling unit include a plurality of swirling portions, the swirling portion located closest to the main fuel injecting portion causes inflow air to flow straight in a substantially radially inward direction, and the remaining swirling portions give a swirl velocity component to inflow air.

According to this configuration, in the vicinity of the main fuel injecting portion of the second inflow channel, the air flow simply flowing straight in a substantially radially inward direction is generated by the swirling portion located closest to the main fuel injecting portion. Meanwhile, the swirl air flow is generated by the remaining swirling portions at a position away from the main fuel injecting portion in the second inflow channel. When the output of the gas turbine engine is intermediate, that is, when the flow quantity of the fuel is small and the injection velocity of the fuel is low, the momentum of the fuel is small. Therefore, most of the fuel injected from the main fuel injecting portion cannot reach the swirl air flow generated by the remaining swirling portions. On this account, the fuel in the form of a mist is not diffused in the radial direction by the swirl air flow and flows in the radially inward direction together with the air flow flowing in the radially inward direction. Thus, the fuel-air mixture is generated such that the fuel distribution is positioned on an inner peripheral side of the air channel of the main injector. As a result, the fuel-air mixture having a high fuel concentration is supplied to a region which is located on a radially inward side and close to the first combustion region. Thus, the combustion efficiency when the output of the gas turbine engine is intermediate further improves.

When the output of the gas turbine engine is high, that is, when the flow quantity of the fuel injected from the main fuel injecting portion is large and the injection velocity of the fuel is high, the momentum of the fuel is large. Therefore, the fuel is inject to a wide range of the second inflow channel, a part of the injected fuel flows in the radially inward direction as with when the output of the gas turbine engine is intermediate, and the remaining fuel reaches the swirl air flow generated by the other swirling portions to flow in a radially outward direction. As a result, when the output of the gas turbine engine is high, the fuel-air mixture is uniformly generated in the entire air channel of the main injector. Thus, the NOx reduction is realized. As above, by such a simple configuration, the fuel distribution suitable for output conditions is realized, and a desired performance can be obtained.

In a preferred mode of the present invention, a position of an exit end of the pilot injector coincides with or is upstream of a position of an exit end of the main injector in the axial direction. In this case, it is preferable that a ratio W/Dm that is a ratio of an axial distance W between the exit ends to an inner diameter Din of the exit end of the main injector be 0.25 or less. According to this configuration, the fuel-air mixture from the main injector promptly contacts the first combustion region in the vicinity of the exit of the pilot injector. As a result, when the output of the gas turbine engine is intermediate, the fuel-air mixture of the main injector starts combusting from a further upstream side, so that the combustion efficiency improves.

In the present invention, it is preferable that the fuel injector further include an annular dividing wall configured to define a boundary between the pilot injector and the main injector, and a ratio T/Dp that is a ratio of a radial width T of an exit end of the dividing wall to an inner diameter Dp of the exit end of the pilot injector be 0.02 to 0.15. According to this configuration, since the dividing wall is adequately small (thin), the fuel-air mixture from the main injector easily contacts the first combustion region when the output of the gas turbine engine is intermediate. As a result, the flame holding is easily realized by the flame of the first combustion region. Thus, the combustion efficiency can be improved.

In the present invention, it is preferable that the fuel injector further include an annular dividing wall configured to define a boundary between the pilot injector and the main injector, and a virtual extended inner peripheral surface extending from an exit end of an inner peripheral surface of the dividing wall in a downstream direction and a virtual extended outer peripheral surface extending from an exit end of an outer peripheral surface of the dividing wall in the downstream direction extend in parallel with each other in the downstream direction or gradually separate from each other as they extend in the downstream direction. According to this configuration, when the output of the gas turbine engine is low, that is, when the main injector is not operating, the interference of the air from the main injector and the first combustion region of the pilot injector is prevented. Thus, high ignitability of the pilot injector and high combustion efficiency can be maintained.

In the present invention, it is preferable that a radially inner surface of the first inflow channel include: an inside flare portion formed in a vicinity of an exit end of the radially inner surface and configured to increase in diameter toward a downstream side; and an inside reduced-diameter portion provided upstream of the inside flare portion and configured to reduce in diameter toward the downstream side. According to this configuration, the first inflow channel is shaped so as to get close to the pilot injector once at the inside reduced-diameter portion and then widen at the inside flare portion located in the vicinity of the exit end. As a result, in the vicinity of the immediately downstream side of the exit end of the pilot injector, the fuel-air mixture of the main injector easily contacts the first combustion region, so that high combustion efficiency when the output of the gas turbine engine is intermediate can be maintained.

In the present invention, it is preferable that a ratio Q1/Q2 that is a ratio of a flow quantity Q1 of the air flowing through the first inflow channel to a flow quantity Q2 of the air flowing through the second inflow channel be in a range from 3/7 to 7/3. According to this configuration, the fuel concentration does not become high locally in the air channel of the main injector. Therefore, the flame temperature at the time of the combustion can be suppressed to a low level, and the generation of the NOx can be suppressed. In addition, the damages on the wall surface by the flashback or auto ignition under high temperature and pressure can be avoided.

According to the fuel injector of the present invention, after the air having the major component in the axial direction in the first inflow channel and the fuel-air mixture having the major component in the radial direction in the second inflow channel meet, the air and the fuel are adequately mixed with each other in a comparatively short distance. Thus, when the output of the gas turbine engine is intermediate or high, that is, when the main injector is operating, the amount of NOx emission becomes small. In addition, since the fuel is injected only to the second inflow channel, a fuel channel and its cooling structure can be simplified. In a case where the fuel is injected to the second inflow channel from the main fuel injecting portion provided at the portion which defines a boundary between the first inflow channel and the second inflow channel, and the output of the gas turbine engine is intermediate, that is, the injection velocity of the fuel is lower than that when the output of the gas turbine engine is high, and a fuel spray penetration distance is short, the fuel having been injected only to the second inflow channel flows on a radially inward side, that is, on the pilot injector side. Therefore, the fuel gets close to the first combustion region where the combustion state is stable. As a result, the flame holding effect by the first combustion region is easily obtained. Thus, the combustion efficiency improves. Meanwhile, when the output of the gas turbine engine is high, that is, when the injection velocity of the fuel is high and the fuel spray penetration distance is long, the fuel-air mixture is generated uniformly in the entire air channel of the main injector, so that the NOx reduction is further realized. As above, by such a simple configuration, the fuel distribution suitable for the output conditions is realized, and a desired performance can be obtained.

DESCRIPTION OF THE PREFERRED EMBODIMENTS

Hereinafter, preferred embodiments of the present invention will be explained in reference to the drawings.

Figure 1:
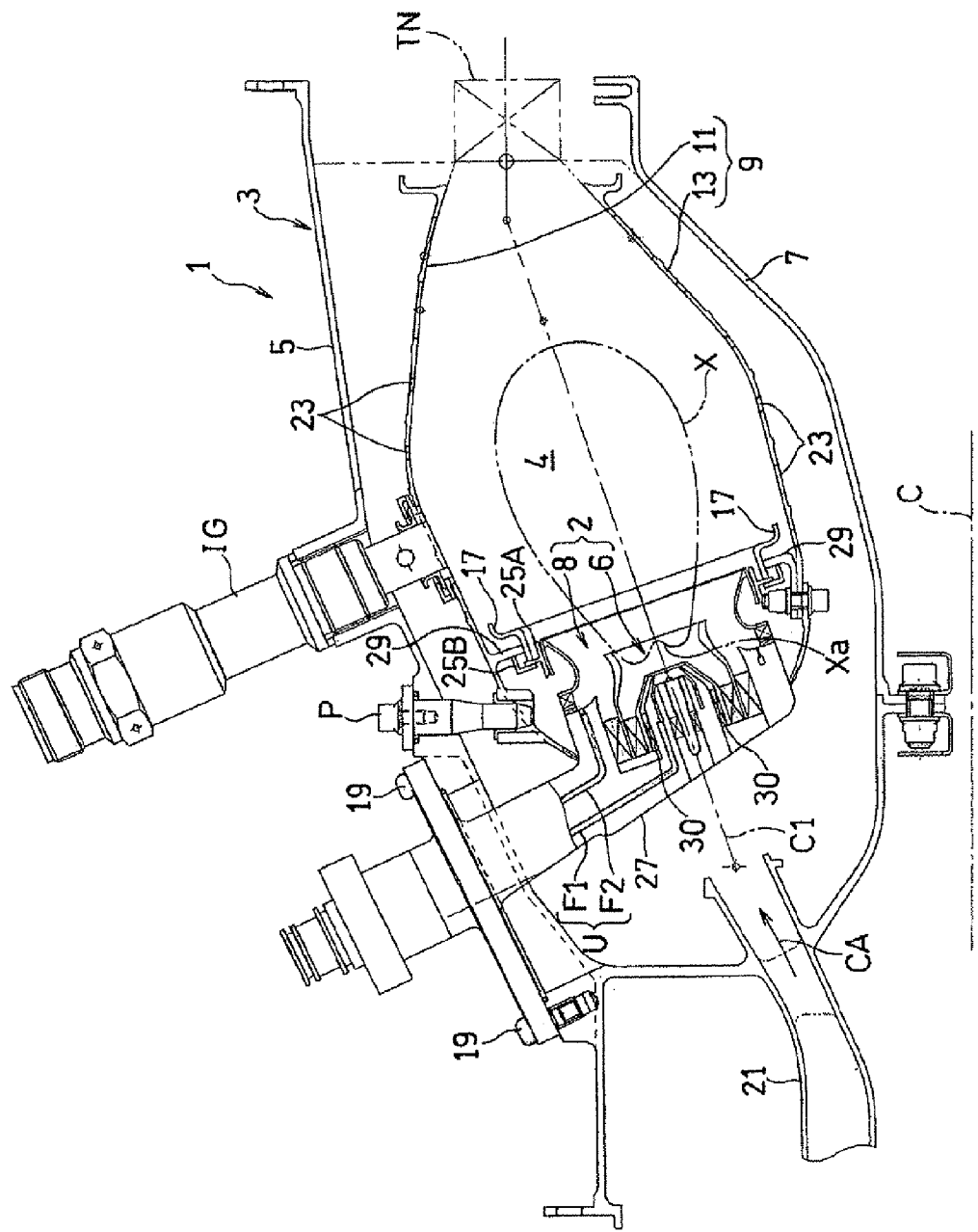
FIG. 1 is a cross-sectional view showing a combustor of a gas turbine engine including a fuel injector according to one embodiment of the present invention.

FIG. 1 shows a combustor 1 of a gas turbine engine including a fuel injector 2 according to one embodiment of the present invention. The combustor 1 mixes fuel with compressed air supplied from a compressor (not shown) of the gas turbine engine, combusts the obtained mixture, and supplies a high temperature and pressure combustion gas, generated by this combustion, to drive the turbine.

The combustor 1 is an annular type, and an annular outer casing 5 and an annular inner casing 7 provided inside the annular outer casing 5 constitute a combustor housing 3 including an annular internal space. The annular outer casing 5 and the annular inner casing 7 are provided coaxially with an engine rotation central axis C. In the annular internal space of the combustor housing 3, an annular combustor liner 9 is provided coaxially with the combustor housing 3. The combustor liner 9 is configured such that: an annular outer liner 11 and an annular inner liner 13 provided inside the annular outer liner 11 are provided coaxially with each other; and an annular combustion chamber 4 is formed in the combustor liner 9. A plurality of fuel injectors 2 configured to inject the fuel to the combustion chamber 4 are arranged on an upstream wall of the combustor liner 9 coaxially with the engine rotation central axis C, that is, in a circumferential direction of the combustor liner 9 at regular intervals. Each of the fuel injectors 2 includes a pilot injector 6 and a main injector 8. The main injector 8 is provided coaxially with a central axis C1 of the pilot injector 6 so as to surround an outer periphery of the pilot injector 6 and generates a fuel-air mixture. Each fuel injector 2 is supported on the combustor housing 3 by a stem portion 27 attached to the combustor housing 3 by fastening members 19. An ignition plug 1G configured to perform ignition is provided so as to extend in a radial direction of the combustor liner 9 and penetrate the outer casing 5 and the outer liner 11, and a tip end of the ignition plug IG is located close to the fuel injector 2.

Compressed air CA is supplied from the compressor through an annular air induction passage 21 to the annular internal space of the combustor housing 3. This compressed air CA is supplied to the fuel injector 2 and is also supplied to the combustion chamber 4 through a plurality of air introducing holes 23 formed on the outer liner 11 and inner liner 13 of the combustor liner 9. The stem portion 27 forms a fuel pipe unit U. The fuel pipe unit U includes a first fuel supply system F1 configured to supply the fuel to the pilot injector 6 and a second fuel supply system F2 configured to supply the fuel to the main injector 8.

A downstream portion of the fuel injector 2 is supported by an outer support 29 via a flange 25A and a supporting body 25B. The flange 25A and the supporting body 25B are provided on an outer peripheral portion of the downstream portion of the fuel injector 2, and the outer support 29 is formed integrally with the outer liner 11. The outer liner 11 is supported by the outer casing 5 using a liner fixing pin P. The outer support 29 projects in a radially inward direction of the fuel injector 2 and is protected from high temperature of the combustion chamber 4 by a heat shield 17 internally fitted in the outer support 29. A first-stage nozzle TN of the gas turbine engine is connected to a downstream end portion of the combustor liner 9.

Figure 2:
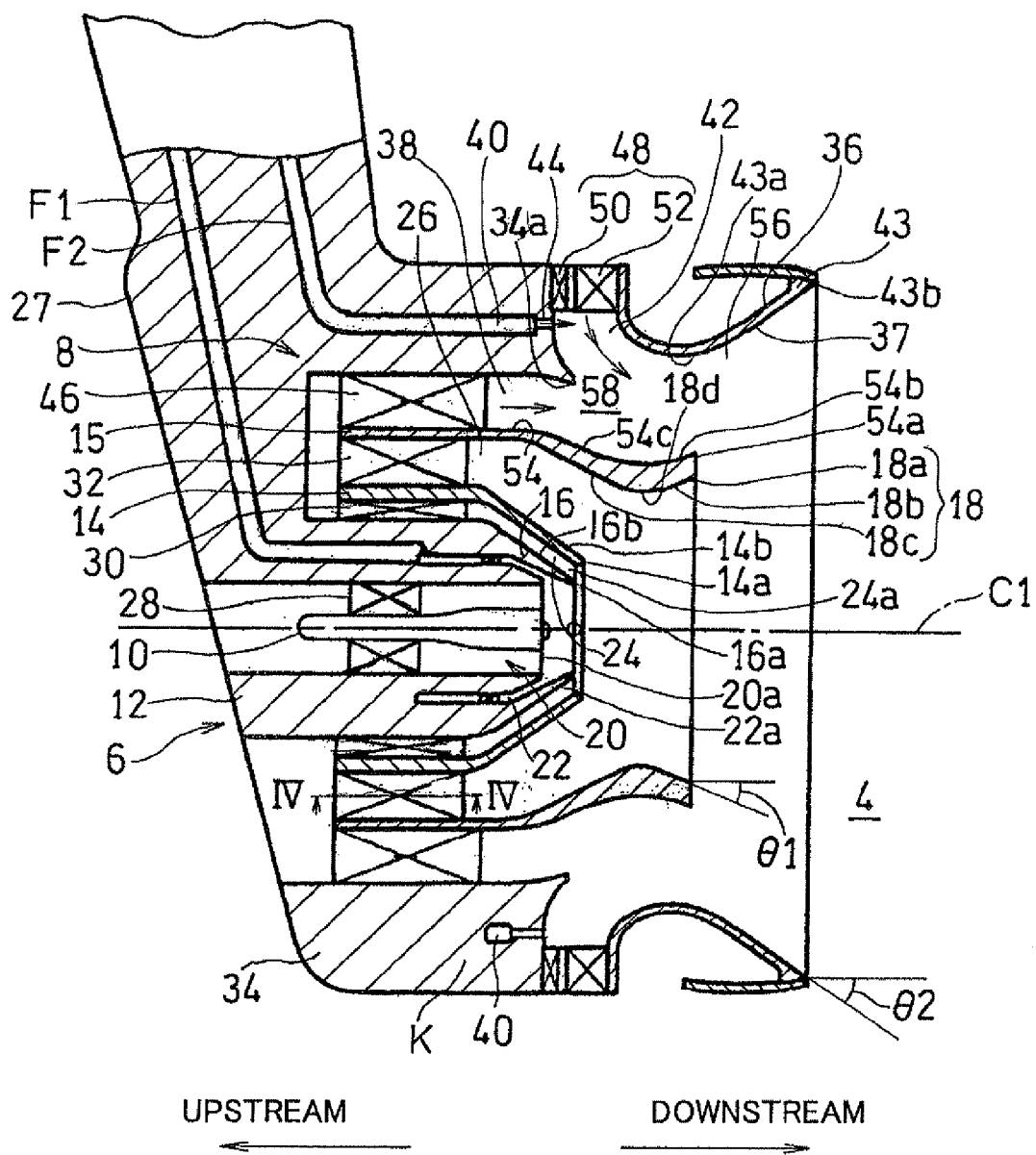
FIG. 2 is a longitudinal sectional view showing the fuel injector in detail.
Figure 3:
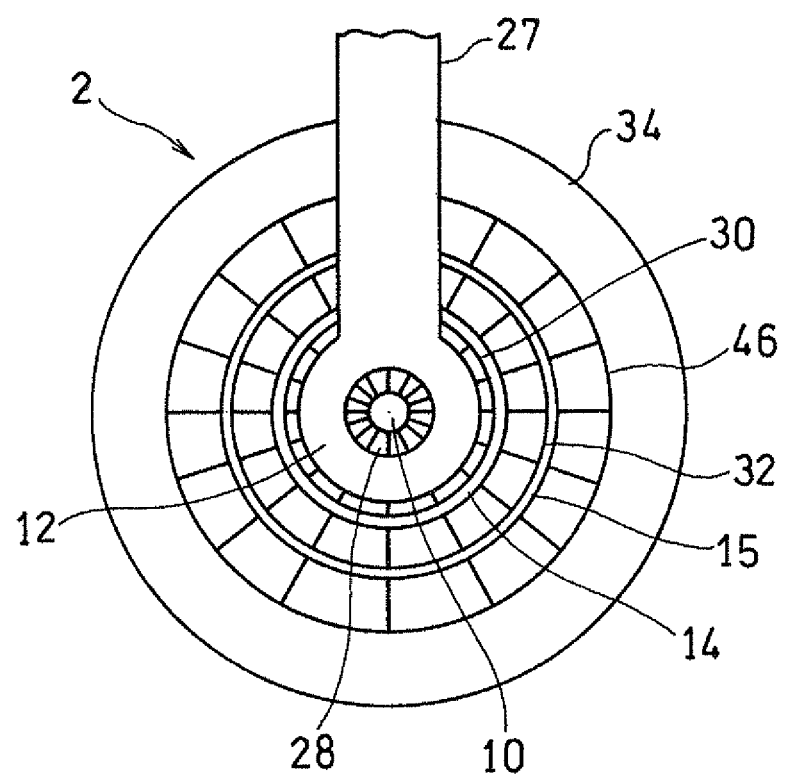
FIG. 3 is a longitudinal sectional view showing the fuel injector when viewed from an axially upstream side.

FIG. 2 is a longitudinal sectional view showing the fuel injector 2 of FIG. 1 in detail. The pilot injector 6 provided at a center portion of the fuel injector 2 includes a central body 10, an inside tubular body 12, an outside cylindrical body 14, and an inner shroud 15. The central body 10 is provided on the central axis C1. The inside tubular body 12 is provided coaxially with the central body 10, is formed integrally with the stem portion 27, and forms a main body of the pilot injector 6. The outside cylindrical body 14 is provided outside the inside tubular body 12 and coaxially with the inside tubular body 12. The inner shroud 15 is an annular dividing wall provided outside the outside cylindrical body 14 and coaxially with the outside cylindrical body 14. The inner shroud 15 defines a boundary between the pilot injector 6 and the main injector 8. A venturi nozzle-shaped pilot outer peripheral nozzle 18 is formed at a downstream portion of an inner peripheral surface of the inner shroud 15. As shown in FIG. 3, except for a portion where the pilot outer peripheral nozzle 18 is formed, the stem portion 27 is formed in a long and thin shape having a width smaller than an inner diameter of a below-described inside swirler 30.

The inside tubular body 12 of the pilot injector 6 shown in FIG. 2 is supported by a base portion 19 (FIG. 1) connected to the fuel pipe unit U (FIG. 1) of the first fuel supply system F1. A strut 28 configured to support the central body 10 on the inside tubular body 12 is fixed inside the inside tubular body 12. An annular center nozzle 20 is formed between the central body 10 and the inside tubular body 12 and forms an inside air channel concentrically with the central axis C1. The diameter of the central body 10 gradually increases on a downstream side of the strut 28 such that the air flow in the center nozzle 20 accelerates toward the downstream side. An annular pilot fuel channel 22 configured to communicate with the first fuel supply system F1 is formed in a downstream portion of the inside tubular body 12. An outside air channel 24 is formed between the inside tubular body 12 and the outside cylindrical body 14, and a supplemental air channel 26 is formed between the outside cylindrical body 14 and the inner shroud 15.

The inside swirler 30 is provided upstream of the outside air channel 24, and an outside swirler 32 is provided upstream of the supplemental air channel 26. The inside swirler 30 swirls the air around the central axis C1 of the pilot injector 6. The outside swirler 32 is a diffuser type which more strongly swirls the air than the inside swirler 30. To be specific, swirling directions of the swirlers 30 and 32 are the same as each other, and a swirling angle of the outside swirler 32 is larger than that of the inside swirler 30. The swirling angle is an exit attachment angle of a blade with respect to a flat surface including the central axis C1. As above, the pilot injector 6 includes the outside air channel 24, the supplemental air channel 26, the central body 10, the strut 28, and the swirlers 30 and 32. It is preferable that the swirling angle of air jet that is air flow ejected from the center nozzle 20 be less than 10° at an exit of the center nozzle. For example, in a case where air flow field on an upstream side of the fuel injector 2 is stable or in a case where there are limitations regarding manufacture, the central body 10 and the strut 28 may be simplified by devising an inside shape of the inside tubular body 12. The exit swirling angle of the inside swirler 30 is, for example, 30° and preferably 20 to 50°. The exit swirling angle of the outside swirler 32 is, for example, 50° and preferably 40 to 60°.

Figure 4A:
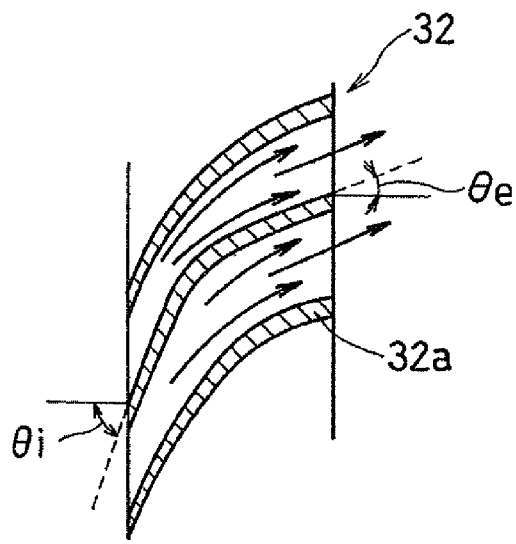
FIG. 4A is a cross sectional view taken along line IV-IV of FIG. 2.
Figure 4B:
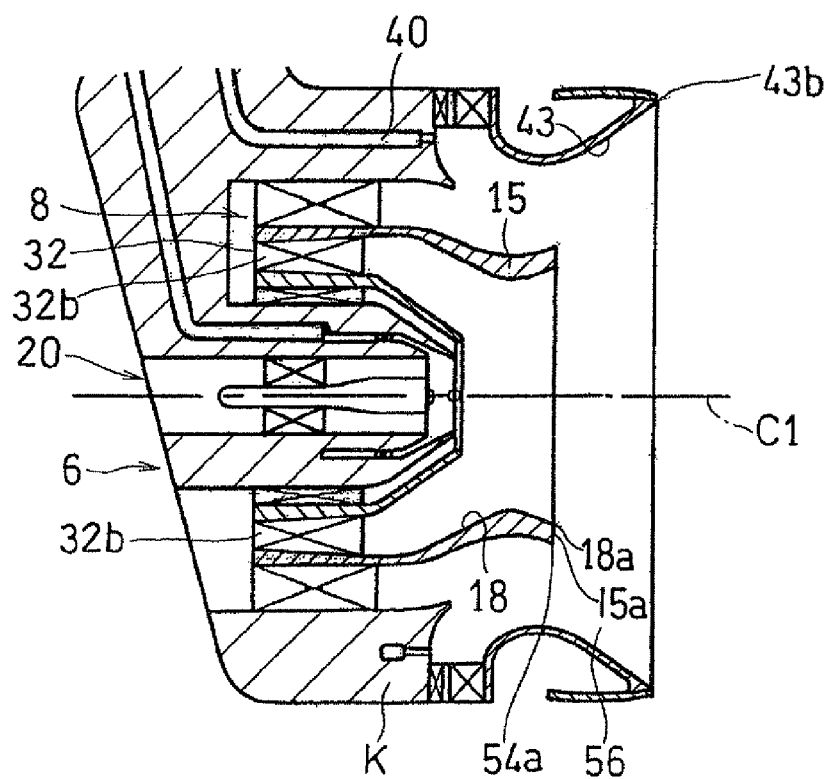
FIG. 4B is a longitudinal sectional view showing a modification example of an outside swirler.

As shown in FIG. 4A, regarding the outside swirler 32, an entrance angle (angle of a front edge with respect to the axial direction) $\theta_1$ of each vane (blade) is set to be larger than an exit angle (angle of a rear edge with respect to the axial direction) $\theta_e$, and each air channel widens toward the downstream side. To be specific, the outside swirler 32 includes a plurality of diffuser vanes 32a, which are smoothly curved in the circumferential direction such that an effective cross-sectional area of the air channel in a direction perpendicular to the air flow becomes large. As shown in FIG. 4B, the outside swirler 32 may include a plurality of diffuser vanes 32b, each of whose vane height (radial height of the channel) increases toward the downstream side so that the air channel widens. The outside swirler 32 may be a normal swirler including a plurality of vanes configured such that the cross-sectional area of the air channel in the direction perpendicular to the air flow is constant or decreases from the entrance toward the exit.

The pilot fuel channel 22 of FIG. 2 is formed on the inside tubular body 12 and is located between the center nozzle 20 and the outside air channel 24. The fuel from the first fuel supply system F1 is injected from a pilot fuel injecting portion 22a, formed at a downstream end of the pilot fuel channel 22, toward the center nozzle. The pilot fuel injecting portion 22a is a pre-filmer type including an annular opening through which the fuel is injected in an annular film shape. Each of a downstream portion 16b of an outer peripheral portion 16 of the inside tubular body 12 and a downstream portion 14b of the outside cylindrical body 14 is shaped to taper toward the downstream side. The outer peripheral portion 16 is formed at an outer peripheral side of the pilot fuel channel 22. With this, the pilot fuel channel 22 and the outside air channel 24 incline by the downstream portions 16b and 14b toward the inside air channel 20 in the radially inward direction. A downstream end 16a of the outer peripheral portion 16 of the inside tubular body 12 and a downstream end 14a of the outside cylindrical body 14 are located on a downstream side of the vicinity of the exit of the center nozzle 20. To be specific, the pilot fuel injecting portion 22a that is the downstream end of the pilot fuel channel 22 and an exit end 24a of the outside air channel 24 face the vicinity of an exit 20a of the center nozzle 20.

The pilot outer peripheral nozzle 18 is formed by an inner peripheral surface of a downstream portion of the inner shroud (dividing wall) 15, the downstream portion being located downstream of the outside swirler 32. The pilot outer peripheral nozzle 18 includes a pilot flare portion 18b and a pilot reduced-diameter portion 18c. The pilot flare portion 18b is provided in the vicinity of an exit end 18a of the pilot outer peripheral nozzle 18 and increases in diameter toward the downstream side. The pilot reduced-diameter portion 18c is provided upstream of the pilot flare portion 18b and reduces in diameter toward the downstream side. To be specific, the inner diameter of the pilot outer peripheral nozzle 18 becomes minimum at a narrow portion 18d that is a boundary between the pilot flare portion 18b and the pilot reduced-diameter portion 18c. As above, the pilot outer peripheral nozzle 18 is shaped to narrow once and then widens toward the downstream side. The pilot flare portion 18b inclines at a tilt angle $\theta 1$ with respect to the direction of the central axis C1. In the present embodiment, the tilt angle $\theta 1$ is 20° and preferably 15 to 30°. As long as the tilt angle $\theta 1$ is in this range, a pilot combustion region A1 that is a below-described first combustion region can appropriately spread in a radially outward direction. Thus, high combustion efficiency can be maintained.

The downstream end 16a of the outer peripheral portion 16 of the inside tubular body 12 and the downstream end 14a of the outside cylindrical body 14 are located slightly upstream of the narrow portion 18d of the pilot outer peripheral nozzle 18. As described above, the downstream portion 14b of the outside cylindrical body 14 tapers toward the downstream side. To correspond to this tapered shape, the pilot outer peripheral nozzle 18 includes the pilot reduced-diameter portion 18c which narrows once toward the downstream side. With this, the channel area of the supplemental air channel 26 does not drastically increase on a radially outer side of the downstream portion 14b of the outside cylindrical body 14. Therefore, the separation of the air flow along an outer peripheral surface of the outside cylindrical body 14 can be suppressed, and the outer peripheral surface of the outside cylindrical body 14 can be prevented from burning out by the combustion gas in the combustion chamber 4.

The air having flowed through the pilot injector 6 except for the air jet flowing through the center nozzle 20 diffuses toward an outer peripheral side by the swirling. Regarding the air flow immediately after the exit of the fuel injector 2, negative pressure is generated in the vicinity of the central axis C1 by strong swirling of the air mainly from the main injector 8, and a radially inward pressure gradient and a radially outward centrifugal force are balanced. However, the strong swirling air flow from the main injector 8 spreads, decays, and weakens as it flows toward the downstream side. Therefore, the pressure in the vicinity of the central axis C1 gradually recovers toward the downstream side. On this account, on the central axis C1 located downstream of the fuel injector 2, an adverse pressure gradient is generated, that is, the pressure is higher on the downstream side than on the upstream side. As a result, a recirculation region X (FIG. 1) in which reverse flow from the downstream side toward the upstream side occurs is formed.

Meanwhile, the pilot fuel injecting portion 22a injects fuel F to the air flowing through the center nozzle 20. The air jet from the center nozzle 20 flows substantially straight in an axially downstream direction, is mixed with ambient air in the recirculation region X, and disappears. Then, the fuel in the form of a mist reaches a center portion of the recirculation region X and vaporizes and combusts in the recirculation region X to form the pilot combustion region A1. If the momentum of the air jet having been emitted from the center nozzle 20 is large, a concave portion Xa may be formed on the recirculation region X in a process in which the air jet gets into the recirculation region X and disappears.

The air having flowed through the pilot injector 6 spreads in the radially outward direction while swirling along the pilot flare portion 18b. With this, the recirculation region X (FIG. 1) formed by the air from the pilot injector 6 can moderately spread in the radially outward direction. The pilot combustion region A1 (FIG. 6) is formed by injecting the fuel from the pilot injector 6 to the moderately spread recirculation region X. Therefore, high combustion efficiency can be maintained even when the output of the gas turbine engine is low.

Referring back to FIG. 2, the main injector 8 fitted on the outer periphery of the pilot injector 6 will be explained. The main injector 8 includes a ring portion 34 and an outer shroud 36. The ring portion 34 is provided on a radially outer side of the inner shroud 15 and coaxially with the inner shroud 15 and is formed integrally with the stem portion 27. The outer shroud 36 is provided on an axially downstream side of the ring portion 34. An annular first air channel 38 is formed between the inner shroud 15 and the ring portion 34. The annular first air channel 38 is an inflow channel through which the air having a major flow component in the axial direction of the fuel injector 2 is taken, that is, the air is taken in a state where an axial flow component of the air in the vertical cross section including the central axis C1 in FIG. 2 is larger than a radial flow component thereof. An annular second air channel 42 is formed between the ring portion 34 and the outer shroud 36. The second air channel 42 is an inflow channel through which the air having a major flow component in the radial direction of the fuel injector 2 is taken, that is, the air is taken in a state where the radial flow component of the air in the vertical cross section including the central axis C1 in FIG. 2 is larger than the axial flow component thereof. To be specific, a downstream end surface of the ring portion 34 forms one side wall of the second air channel 42, and an upstream portion of an inner peripheral surface 37 of the outer shroud 36 forms another side wall of the second air channel 42. The ring portion 34 defines a boundary between the first air channel 38 and the second air channel 42.

The first air channel 38 extends from an entrance of a below-described main inside swirler 46 up to an inner peripheral rear end edge 34a of the ring portion 34. The second air channel 42 extends from an entrance of a below-described main outside swirler 48 up to the inner peripheral rear end edge 34a of the ring portion 34. A premixing chamber 58 where the air flow from the first air channel 38 and the air flow from the second air channel 42 meet is located downstream of these two channels 38 and 42 and is formed between the outer shroud 36 and the inner shroud 15. A main channel 56 is constituted by the first air channel 38, the second air channel 42, and the premixing chamber 58.

Figure 6:
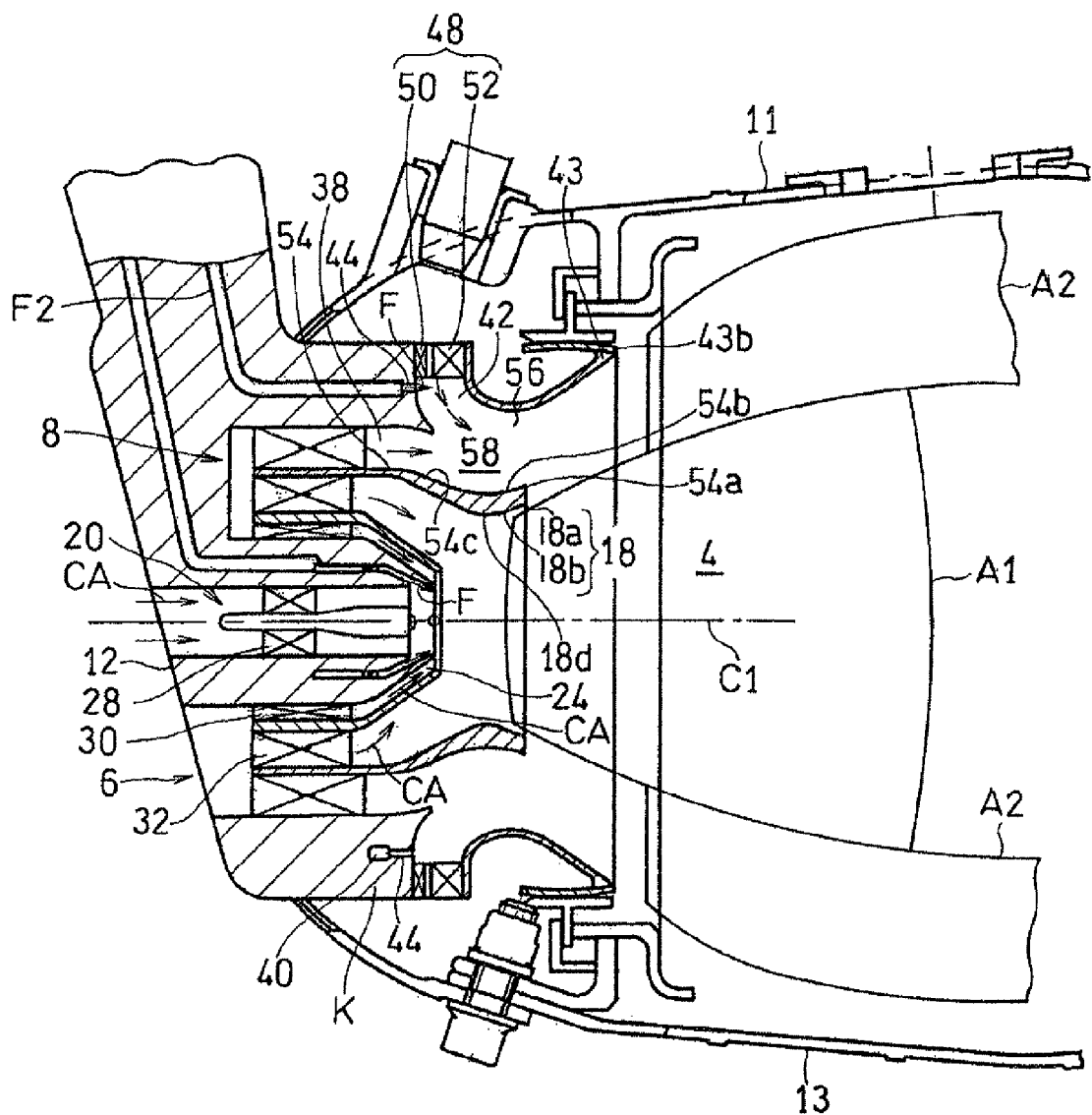
FIG. 6 is a longitudinal sectional view showing a state of the fuel injector when the output of the gas turbine engine is high or intermediate.

An annular main fuel injecting portion 40 connected to the second fuel supply system F2 is formed in the ring portion 34 which defines a boundary between the first air channel 38 and the second air channel 42. When the output of the gas turbine engine is low, the fuel is not supplied to the main injector 8. Only when the output of the gas turbine engine is intermediate or high, the fuel is supplied from the second fuel supply system F2 to the main injector 8. The main fuel injecting portion 40 injects the fuel only to the second air channel 42. The injected fuel is mixed with the air flow from the main outside swirler 48 and the air flow from the main inside swirler 46 in the premixing chamber 58. Thus, a pre-mixture is produced. The pre-mixture is supplied to and combusted in the combustion chamber 4. With this, a premix combustion region A2 shown in FIG. 6 is formed.

Figure 7:
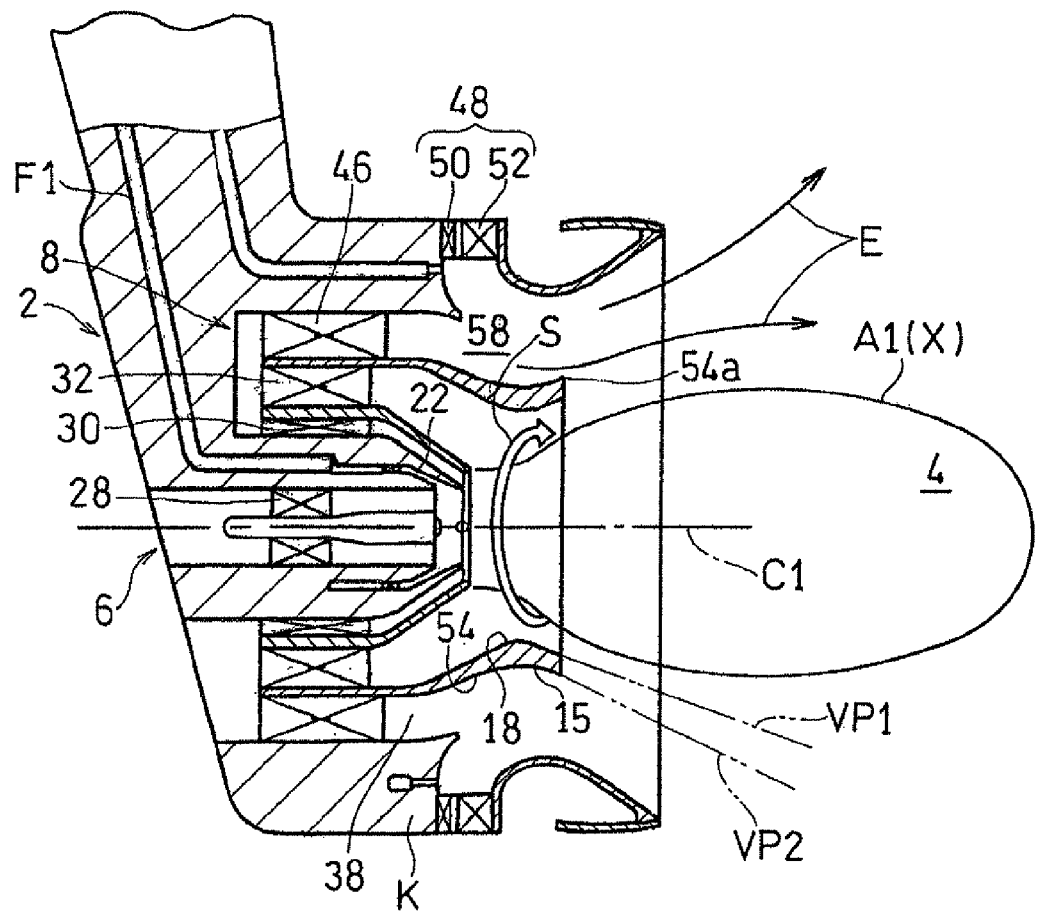
FIG. 7 is a longitudinal sectional view showing a state of the fuel injector when the output of the gas turbine engine is low.

As shown in FIG. 7, when the output of the gas turbine engine is low, that is, when the fuel is not supplied to the main injector 8, a main air flow E having flowed through the swirlers 46 and 48 is supplied to the combustion chamber 4 through the premixing chamber 58.

A downstream portion of the inner peripheral surface 37 of the outer shroud 36 shown in FIG. 2 forms a main exit flare 43 of the main injector 8. The main exit flare 43 widens from a base end portion 43a that is an upstream end thereof toward an exit end 43b that is a downstream end thereof. The base end portion 43a is a portion which projects most in the radially inward direction. To be specific, an outer peripheral surface of the main channel 56 that is the air channel of the main injector 8 widens toward an exit end thereof. The vicinity of the exit end 43b of the main exit flare 43 inclines at a tilt angle θ2 with respect to the central axis C1. With this, as shown in FIG. 7, the main air flow E spreads in the radially outward direction and can be prevented from significantly interfering with the pilot combustion region A1 when the output of the gas turbine engine is low. The tilt angle θ2 of the main exit flare 43 shown in FIG. 2 is about 35° and preferably 20 to 50°. As long as the tilt angle θ2 is in this range, the recirculation region X can adequately spread in the radially outward direction and the flame holding performance can be improved while preventing the interference with the pilot combustion region A1.

Figure 5:
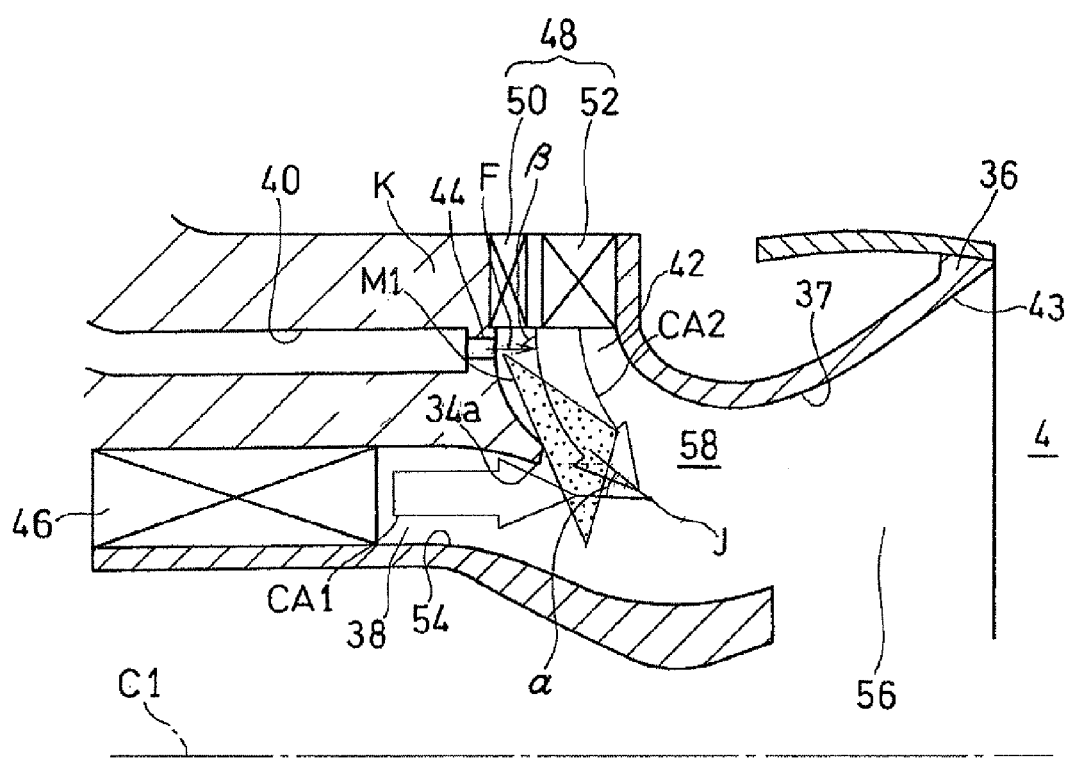
FIG. 5 is an enlarged longitudinal sectional view showing a main air channel of the fuel injector.

As clearly shown in FIG. 5, the second air channel 42 is smoothly curved toward the combustion chamber 4 as it extends toward the downstream side. Air CA2 from the exit of the second air channel 42 and air CA1 from the exit of the first air channel 38 meet at an intersection angle α at an intersection point J of the premixing chamber 58. The intersection angle α is preferably in a range from 40 to 80° in order to generate strong turbulence of the air flow when the air CA1 from the exit of the first air channel 38 and the air CA2 from the exit of the second air channel 42 meet.

A plurality of main fuel injection holes 44 are formed on the main fuel injecting portion 40 so as to be located at a portion of the second air channel 42 and arranged in the circumferential direction at regular intervals, the portion of the second air channel 42 being located upstream of the intersection point J. The plurality of main fuel injection holes 44 inject the fuel to the second air channel 42 from the upstream side (left side in FIG. 5) to the downstream side (right side in FIG. 5) in the axial direction. The main fuel injection holes 44 may be arranged at irregular intervals. The main fuel injection holes 44 are open on an axially upstream wall surface of the second air channel 42 and inject the fuel by a plane jet method. Preferably, five or more main fuel injection holes 44 are arranged in the circumferential direction. An angle β between the flow of the air of the second air channel 42 and the flow of the fuel injected from the main fuel injection holes 44 is substantially 90° in the vicinity of the main fuel injection holes 44. The angle β is preferably 70 to 90° in order to promote the atomization of the fuel by the air flow.

The fuel-air mixture generated by injecting the fuel from the main fuel injection holes 44 toward the air flow CA2 in the second air channel 42 meets the air CA1 flowing in the axial direction in the first air channel 38. Since the fuel-air mixture meets the air CA1 at a certain angle, the air turbulence further promotes the mixing of the air and the fuel. After the fuel-air mixture and the air CA1 meet, the fuel-air mixture is further mixed in the premixing chamber 58 and then sprayed to the combustion chamber 4.

Here, a ratio Q1/Q2 is preferably 3/7 to 7/3, the ratio Q1/Q2 being a ratio of a flow quantity Q1 of the air CA1 flowing through the first air channel 38 to a flow quantity Q2 of the air CA2 flowing through the second air channel 42. If the flow quantity ratio is out of this range, the fuel and the air are unlikely to be mixed with each other, and the generation of the NOx may not be adequately suppressed. In addition, the possibility of the damages on the wall surface by flashback or auto ignition under high temperature and pressure may increase.

The main inside swirler 46 that is a first swirling unit is attached to an entrance of the first air channel 38. The main outside swirler 48 that is a second swirling unit is attached to an entrance of the second air channel 42. The main outside swirler 48 includes a first swirler 50 and a second swirler 52, which are swirling portions arranged in the axial direction of the main injector 8. Swirl blades of the first swirler 50 provided close to the main fuel injection holes 44 is set such that the air having passed through the first swirler 50 simply flows straight in the substantially radially inward direction. Swirl blades of the second swirler 52 provided away from the main fuel injection holes 44 is set such that the air having passed through the second swirler 52 is swirled around the central axis C1.

When the output of the gas turbine engine is intermediate, that is, when the flow quantity of the fuel from the main fuel injection holes 44 is small and the momentum of the fuel of the main fuel inject holes 44 is small, most of the injected fuel just reaches the air flow having flowed through the first swirler 50 in the radially inward direction. Therefore, the fuel is not diffused in the radial direction by the swirling of the second swirler 52 and flows in the radially inward direction. Thus, the fuel-air mixture is generated on a radially inward side of the main channel 56.

Meanwhile, when the output of the gas turbine engine is high, that is, when the flow quantity of the fuel from the main fuel injection holes 44 is large and the momentum of the fuel of the main fuel injection holes 44 is large, a part of the injected fuel flows in the radially inward direction together with the air flow in the radially inward direction as with when the output of the gas turbine engine is intermediate, but the remaining fuel reaches the swirl flow having flowed through the second swirler 52 and generates the fuel-air mixture, which flows in the radially outward direction together with the swirl flow. As a result, when the output of the gas turbine engine is high, the fuel-air mixture is generated uniformly in the entire main channel 56.

The main outside swirler 48 may be a single swirler. In this case, the main outside swirler 48 includes swirl blades, each of which is formed in such a twisted shape that: the air flowing through a portion, closest to the main fuel injection holes 44, of the swirl blade flows straight in the substantially radially inward direction; and the swirling component increases as the portion where the air flows is away from the main fuel injection holes 44. It should be noted that each of the first swirler 50 and the second swirler 52 may be constituted by a plurality of swirlers arranged in the axial direction.

A main inside flare portion 54b which increases in diameter toward the downstream side is formed in the vicinity of an exit end 54a of a radially inner surface 54 of the first air channel 38 shown in FIG. 2, and a main inside reduced-diameter portion 54c which reduces in diameter toward the downstream side is formed upstream of the main inside flare portion 54b. The exit end 54a of the radially inner surface 54 of the first air channel 38 is located slightly downstream of the base end portion 43a of the main exit flare 43.

As shown in FIG. 7, a virtual extended inner peripheral surface VP1 and a virtual extended outer peripheral surface VP2 gradually separate from each other as they extend in the downstream direction. The virtual extended inner peripheral surface VP1 is a surface extending from the exit end 18a of the inner peripheral surface of the inner shroud 15 in the downstream direction, and the virtual extended outer peripheral surface VP2 is a surface extending from the exit end 54a of the outer peripheral surface of the inner shroud 15 in the downstream direction. The virtual extended inner peripheral surface VP1 and the virtual extended outer peripheral surface VP2 may be arranged in parallel with each other. In other words, these surfaces VP1 and VP2 may be arranged in any manner as long as these surfaces VP1 and VP2 do not intersect with each other on a downstream side of the pilot outer peripheral nozzle 18.

Figure 8:
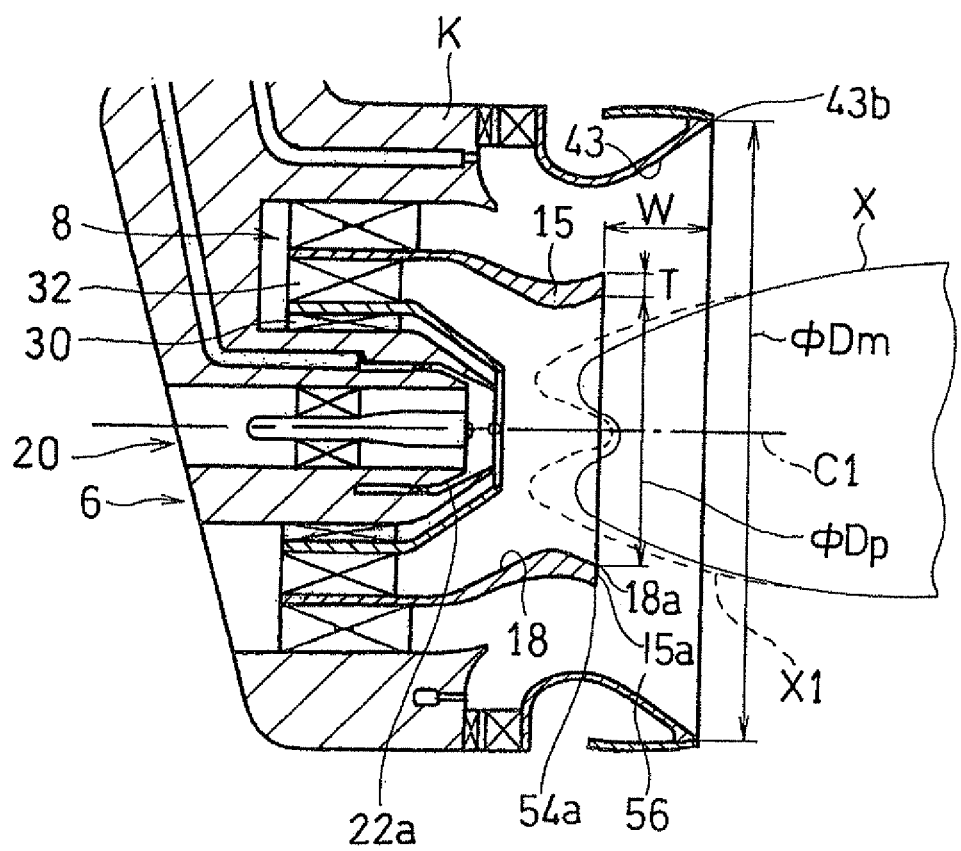
FIG. 8 is an enlarged longitudinal sectional view showing the vicinity of a tip end portion of a nozzle of the fuel injector.

A radial thickness of an exit end surface 15a of the inner shroud 15 is set to be thin. As shown in FIG. 8, a ratio T/Dp is preferably in a range from 0.02 to 0.15, the ratio T/Dp being a ratio of a distance T between the exit end 18a of the inner peripheral surface of the inner shroud 15 and the exit end 54a of the outer peripheral surface of the inner shroud 15, that is, a radial width T of the exit end surface 15a of the inner shroud 15 to an inner diameter Dp of the exit end 18a of the pilot outer peripheral nozzle 18. If the ratio T/Dp is less than 0.02, the main air flow E and the pilot combustion region A1 in FIG. 7 are too close to each other and strongly interfere with each other. This deteriorates the combustion efficiency, ignitability, and flame holding performance of the pilot injector 6 when the output of the gas turbine engine is low. In contrast, if the ratio T/Dp exceeds 0.15, the pilot combustion region A1 and the premix combustion region A2 that is a second combustion region in FIG. 6 are largely spaced apart from each other in the radial direction. This deteriorates the flame holding effect obtained by the pilot flame of the main injector 8 when the output of the gas turbine engine is intermediate, so that the combustion efficiency decreases.

The exit end 18a of the pilot outer peripheral nozzle 18 of FIG. 8 is located upstream of the exit end 43b of the main exit flare 43. Specifically, a ratio W/Dm is preferably 0.25 or lower, and more preferably in a range from 0.1 to 0.25, the ratio W/Dm being a ratio of an axial distance W between the exit ends 18a and 43b to an inner diameter Dm of the exit end 43b of the main exit flare 43. If the ratio W/Dm is less than 0.1, the flame holding effect obtained by the pilot flame deteriorates. Thus, the improvement effect of the combustion efficiency slightly decreases. However, if the combustion efficiency is adequately high, the exit end 18a of the pilot outer peripheral nozzle 18 and the exit end 43b of the main exit flare 43 may coincide with each other in the axial direction. Even if the ratio W/Dm is set to more than 0.25, the improvement of the flame holding effect is limited.

According to the above configuration, when the output of the gas turbine engine is low, the fuel is supplied from the first fuel supply system F1 only to the pilot injector 6 in the fuel injector 2 in FIG. 2. The air having flowed through the pilot injector 6 except for the air having flowed through the center nozzle 20 diffuses toward the outer peripheral side by the swirling. The pilot fuel injecting portion 22a injects the fuel F to the air in the center nozzle 20. The air jet having been emitted from the center nozzle 20 flows substantially straight in the axially downstream direction, is mixed with the ambient air in the recirculation region X, and disappears. Then, most of the fuel in the form of a mist reaches the center portion of the recirculation region X and vaporizes and combusts in the recirculation region X. Thus, the interfere of the fuel F with the main air flow by the diffusing of the fuel F toward the outer peripheral side is suppressed. As a result, the combustion efficiency, ignitability, and flame holding performance of the pilot injector 6 when the output of the gas turbine engine is low can be improved.

Moreover, the virtual extended inner peripheral surface VP1 extending from the exit end 18a of the inner peripheral surface of the inner shroud 15 in the downstream direction and the virtual extended outer peripheral surface VP2 extending from the exit end 54a of the outer peripheral surface of the inner shroud 15 in the downstream direction gradually separate from each other as they extend in the downstream direction. Therefore, the interference of the main air flow E with the pilot combustion region A1 can be suppressed, and the ignitability, flame holding performance, and combustion efficiency of the pilot injector 6 when the output of the gas turbine engine is low can be further improved.

The outside swirler 32 provided on a radially outer side of the inside swirler 30 includes the diffuser vanes 32a (FIGS. 4A and 4B) formed such that the air channel widens toward the downstream side. As above, in a case where the center nozzle 20 is provided in the vicinity of the central axis C1 of the pilot injector 6, and the momentum of the air jet having been emitted from the center nozzle 20 is large, as shown in FIG. 8, the recirculation region X is shaped to be concave in the vicinity of the central axis C1 toward the downstream side. This may deteriorate the combustion efficiency, ignitability, and flame holding performance of the pilot injector 6. Even in this case, if the diffuser-type outside swirler 32 is provided on the radially outer side of the inside swirler 30, the air velocity at the exit of the outside swirler 32 becomes lower than that of a normal swirler. Therefore, as shown by a broken line X1 in FIG. 8, the recirculation region X spreads toward the upstream side in the vicinity of the exit of the outside swirler 32. As a result, the flame of the pilot injector 6 stabilizes, so that the combustion efficiency, ignitability, and flame holding performance of the pilot injector 6 can be prevented from being deteriorated.

Further, the reverse flow region can be moderately spread in the radially outward direction by swirl flow S generated by the outside swirler 32 configured to generate a swirl velocity component stronger than that of the inside swirler 30 of the pilot injector 6 in FIG. 7.

Since the pilot fuel injecting portion 22a is a pre-filmer type configured to inject the fuel in an annular film shape, a shear surface area of the air with respect to the fuel increases, and the atomization of the fuel is promoted. As a result, the NOx reduction when the output of the gas turbine engine is low can be realized.

When the output of the gas turbine engine is intermediate or high, the fuel is supplied to both the pilot injector 6 and the main injector 8. As shown in FIG. 5, in the main injector 8, the fuel F is injected to the second air channel 42, and the air CA2 having the major component in the radial direction and the fuel F are mixed with each other. Next, fuel-air mixture M1 and the air CA1 flowing through the first air channel 38 and having the major component in the axial direction meet in the premixing chamber 58 at a certain angle. With this, the mixing of the fuel and the air is further promoted, so that the air and the fuel are adequately mixed with each other in a comparatively short distance, and the NOx reduction can be realized. In addition, since the fuel is injected only to the second air channel 42, a fuel channel and its cooling structure can be simplified.

The main fuel injecting portion 40 of FIG. 2 injects the fuel F toward the second air channel 42 from a portion K which defines a boundary between the first air channel 38. and the second air channel 42. Therefore, when the output of the gas turbine engine is intermediate, that is, when the momentum of the injection of the main fuel is small, the injected fuel just reaches a region close to the injection holes 44, as compared to when the output of the gas turbine engine is high, that is, when the momentum thereof is large. As a result, the fuel is injected mainly to a position close to the main fuel injecting portion 40 in the air flow of the second air channel 42. Therefore, when the air flow of the second air channel 42 meets the air flow of the first air channel 38 to be changed to the air flow in the axial direction and is then injected to the combustion chamber 4, the fuel in the form of a mist flows on a radially inward side as compared to when the output of the gas turbine engine is high. To be specific, when the output of the gas turbine engine is intermediate, the main fuel in the form of a mist gets close to the pilot combustion region A1 where the flame is stable in FIG. 6, as compared to when the output of the gas turbine engine is high. As a result, the flame holding effect by the flame in the pilot combustion region A1 can be easily obtained. Thus, the combustion efficiency improves. Moreover, the portion K which defines a boundary between the first air channel 38 and the second air channel 42 can generally secure a space widely in many cases. Therefore, a structure, such as a cooling structure for preventing coking, in the main fuel injecting portion 40 can be easily, spatially arranged.

Figure 9A:
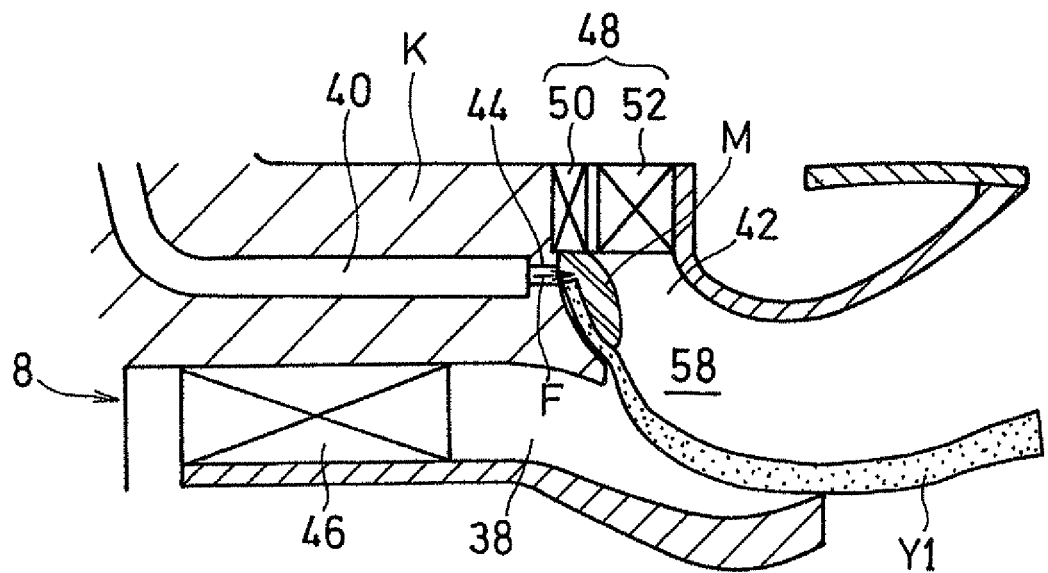
FIG. 9A is an enlarged longitudinal sectional view showing the main air channel of the fuel injector when the output of the gas turbine engine is intermediate.
Figure 9B:
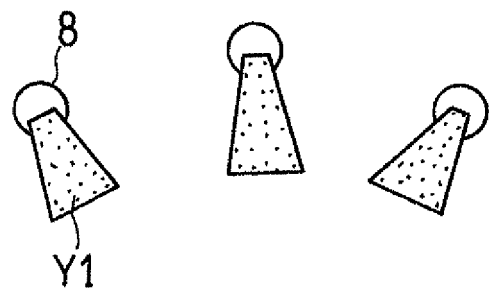
FIG. 9B is a diagram showing a fuel injection state of FIG. 9A when viewed from a downstream side of the channel.

The main inside swirler 46 is attached to the entrance of the first air channel 38, and the main outside swirler 48 is attached to the entrance of the second air channel 42. By the first swirler 50, located close to the main fuel injection holes 44, of the main outside swirler 48, as shown in FIG. 9A, a region M where the air flows straight in the substantially radially inward direction is formed in the vicinity of the main fuel injection holes 44 in the second air channel 42. Meanwhile, a swirling region where the air flows in the radially outward direction by the second swirler 52 is formed at a position away from the main fuel injection holes 44. When the output of the gas turbine engine is intermediate, that is, when the flow quantity of the fuel is small and the injection velocity of the fuel is low, most of the fuel F injected from the main fuel injection holes 44 do not reach the strong swirl flow generated by the second swirler 52, stays in the flow moving straight in the radially inward direction by the first swirler 50, and flows in the radially inward direction. Therefore, fuel-air mixture Y1 is generated on the inner side of the main channel 56. As a result, the fuel-air mixture Y1 which is comparatively thick is ejected to a position close to the pilot combustion region A1 (FIG. 6). Thus, the combustion efficiency when the output of the gas turbine engine is intermediate further improves by the flame holding effect obtained by the pilot combustion region A1.

Figure 10A:
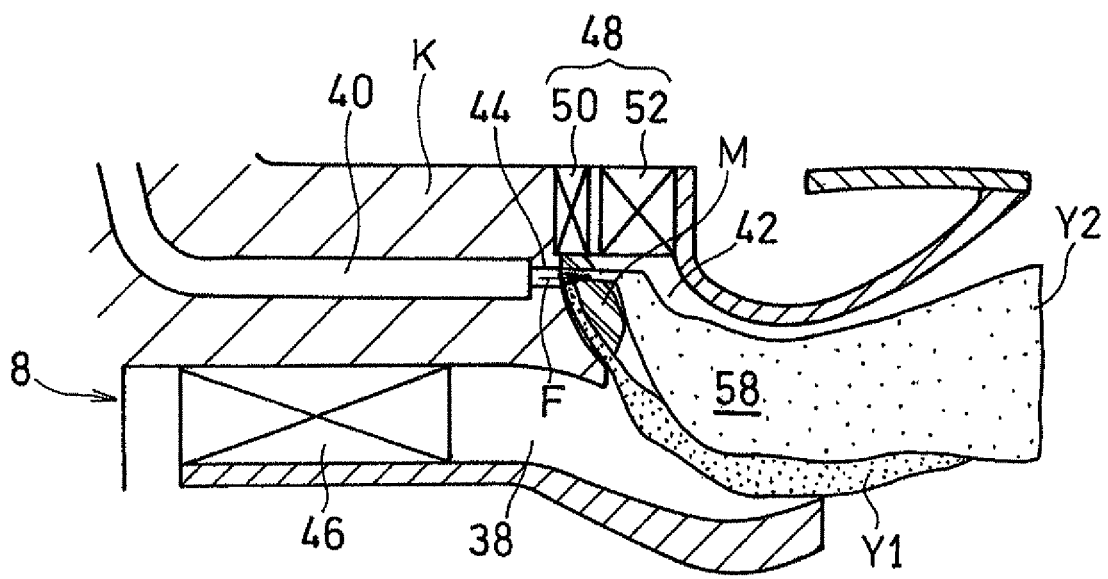
FIG. 10A is an enlarged longitudinal sectional view showing the main air channel of the fuel injector when the output of the gas turbine engine is high.
Figure 10B:
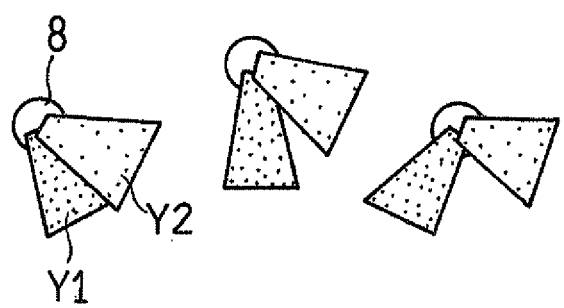
FIG. 10B is a diagram showing the fuel injection state of FIG. 10A when viewed from the downstream side of the channel.

When the output of the gas turbine engine is high, that is, when the flow quantity of the fuel is large and the injection velocity of the fuel is high, as shown in FIGS. 10A and 10B, a part of the fuel F having been injected from the main fuel injection holes 44 stays in the flow moving straight in the radially inward direction by the first swirler 50 and forms the fuel-air mixture Y1 flowing in the radially inward direction. Meanwhile, the remaining fuel flows with the swirl flow generated by the second swirler 52 and forms fuel-air mixture Y2 flowing in the radially outward direction. As a result, when the output of the gas turbine engine is high, the uniform fuel-air mixture Y2 is generated in the entire main channel 56. Thus, the NOx reduction can be realized. As above, by such a simple configuration, fuel distribution suitable for output conditions is realized, and a desired performance can be obtained.

As shown in FIG. 6, the exit end 18a of the pilot outer peripheral nozzle 18 is located upstream of the exit end 43b of the main exit flare 43. Therefore, a pre-mixture M2 of the main channel 56 promptly contacts the pilot combustion region A1 in the vicinity of the exit of the pilot outer peripheral nozzle 18, so that the combustion efficiency when the output of the gas turbine engine is intermediate further improves.

As shown in FIG. 8, in a case where the ratio W/Dm is set to 0.25 or less, the ratio W/Dm being a ratio of the axial distance W between the exit end 18a of the pilot outer peripheral nozzle 18 and the exit end 43b of the main exit flare 43 to the inner diameter Dm of the exit end 43b of the main exit flare 43, the main pre-mixture promptly contacts the pilot combustion region A1 (FIG. 6) in the vicinity of the exit end 18a of the pilot outer peripheral nozzle 18. Therefore, the flame holding effect of the main injector 8 by the pilot flame when the output of the gas turbine engine is intermediate becomes large. Thus, the combustion efficiency further improves.

Since the ratio T/Dp is 0.02 to 0.15, the ratio T/Dp being a ratio of the radial width T of the exit end surface 15a of the annular inner shroud 15 which defines a boundary between the pilot injector 6 and the main injector 8 to the inner diameter Dp of the exit end 18a of the pilot outer peripheral nozzle 18, the main pre-mixture promptly contacts the pilot combustion region A1 in the vicinity of a region located downstream of the exit end 18a of the pilot outer peripheral nozzle 18. Therefore, the combustion efficiency when the output of the gas turbine engine is intermediate can be further improved.

As shown in FIG. 6, the radially inner surface 54 of the first air channel 38 of the main injector 8 is shaped so as to get close to the pilot injector 6 once at the inside reduced-diameter portion 54c and then widen at the inside flare portion 54b located in the vicinity of the exit end 54a. With this, in the vicinity of the region located downstream of the exit end 18a of the pilot outer peripheral nozzle 18, the pre-mixture of the main injector 8 tends to contact the pilot combustion region A1, so that high combustion efficiency when the output of the gas turbine engine is intermediate can be maintained. Meanwhile, when the output of the gas turbine engine is low, on the downstream side of the exit end 54a of the radially inner surface 54 of the first air channel 38 of the main injector 8, the air having flowed through the main injector 8 is adequately diffused in the radially outward direction by the inside flare portion 54b. Thus, the interference of the air having flowed through the main injector 8 with the pilot combustion region A1 of the pilot injector 6 can be suppressed, so that high combustion efficiency when the output of the gas turbine engine is low can be maintained.

Further, since the main exit flare 43 of the main injector 8 is shaped to widen toward its exit end, the air from the main injector 8 spreads in the radially outward direction. Therefore, the recirculation region X can moderately spread in the radially outward direction while avoiding the interference of the air from the main injector 8 with the air from the pilot injector 6. Thus, high combustion efficiency can be obtained even when the output of the gas turbine engine is low.

In addition, since the ratio Q1/Q2 is in a range from 3/7 to 7/3, the ratio Q1/Q2 being a ratio of the flow quantity Q1 of the air flowing through the first air channel 38 to the flow quantity Q2 of the air flowing through the second air channel 42, the flow quantity ratio does not become unbalanced. As a result, the fuel concentration does not become high locally. On this account, the flame temperature at the time of the combustion can be suppressed to a low level, and the generation of the NOx can be suppressed. In addition, the damages on the wall surface by the flashback or auto ignition under high temperature and pressure can be avoided.

Figure 11:
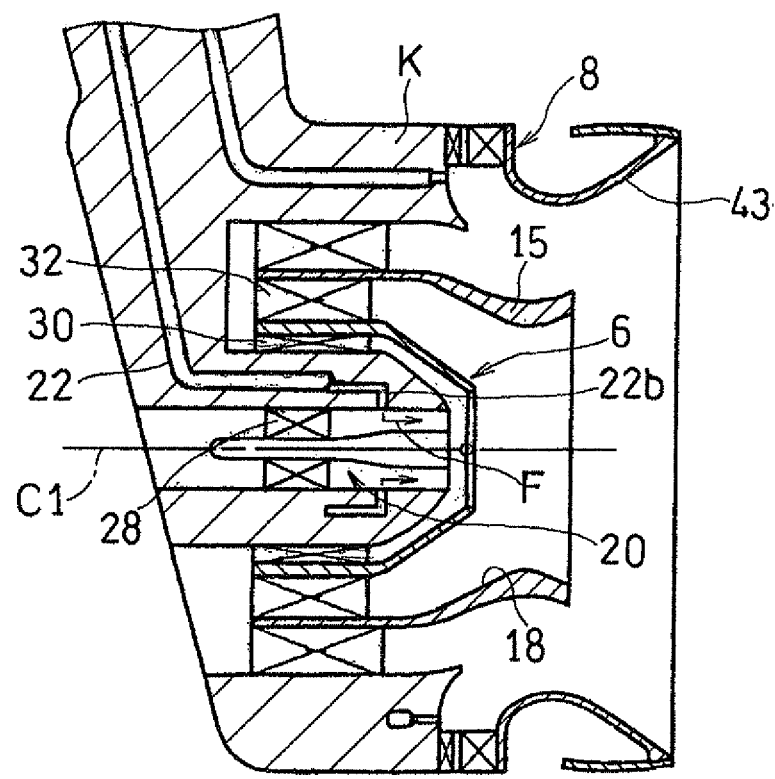
FIG. 11 is a longitudinal sectional view showing the fuel injector according to another embodiment of the present invention in detail.

In the above embodiment, the pilot fuel injecting portion 22a shown in FIG. 2 is a pre-filmer type configured to inject the fuel in an annular film shape. However, the present embodiment is not limited to this. For example, as shown in FIG. 11, a plane jet type pilot fuel injecting portion 22b may be used. The pilot fuel injecting portion 22b is provided with a plurality of small holes through which the fuel F is injected in the radially inward direction, the plurality of small holes being arranged at regular intervals in the circumferential direction. With this, the fuel F is supplied in the radial direction to the center nozzle 20 from the plurality of small holes arranged in the circumferential direction.

The foregoing has explained a preferred embodiment of the present invention in reference to the drawings. However, various additions, modifications, and deletions may be made within the spirit of the present invention. Therefore, such modified embodiments are included within the range of the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A fuel injector comprising:
 a pilot injector configured to spray fuel so as to form a first combustion region in a combustion chamber;
 a main injector provided coaxially with the pilot injector so as to surround the pilot injector and configured to supply a fuel-air mixture that is a mixture of the fuel and air to form a second combustion region in the combustion chamber; and
 an annular dividing wall configured to define a boundary between the pilot injector and the main injector, wherein:
 the main injector includes:
  a first inflow channel configured to take the air therethrough and give the air a major flow component in an axial direction;
  a second inflow channel configured to take the air therethrough and give the air a major flow component in a radial direction;
  a premixing chamber located downstream of the first inflow channel and the second inflow channel such that the air from the first inflow channel and the air from the second inflow channel meet in the premixing chamber; and
  a main fuel injecting portion configured to inject the fuel only to the second inflow channel;
 the first inflow channel supplies to the premixing chamber the air having the major flow component in the axial direction;
 the second inflow channel supplies to the premixing chamber the air having the major flow component in a direction from a radially outer side toward a radially inner side;
 a position of an exit end of the pilot injector is upstream of a position of an exit end of the main injector in the axial direction; and
 the exit end of the pilot injector is an exit end of the annular dividing wall.

2. The fuel injector according to claim 1, wherein the main fuel injecting portion injects the fuel to the second inflow channel from a portion which defines a boundary between the first inflow channel and the second inflow channel.

3. The fuel injector according to claim 1, wherein a ratio W/Dm that is a ratio of an axial distance W between the exit ends to an inner diameter Dm of the exit end of the main injector is between 0 and 0.25.

4. The fuel injector according to claim 1, wherein
 a ratio T/Dp that is a ratio of a radial width T of the exit end of the annular dividing wall to an inner diameter Dp of the exit end of the pilot injector is 0.02 to 0.15.

5. The fuel injector according to claim 1, wherein a radially inner surface of the first inflow channel includes: an inside flare portion formed in a vicinity of an exit end of the radially inner surface and configured to increase in diameter toward a downstream side; and an inside reduced-diameter portion provided upstream of the inside flare portion and configured to reduce in diameter toward the downstream side.

6. The fuel injector according to claim 1, wherein a ratio Q1/Q2 that is a ratio of a flow quantity Q1 of the air flowing through the first inflow channel to a flow quantity Q2 of the air flowing through the second inflow channel is in a range from 3/7 to 7/3.

7. The fuel injector according to claim 1, wherein:
a swirling unit is attached to an entrance of the second inflow channel; and
the swirling unit includes swirl blades, each of which is formed in such a twisted shape that when the air flows through a portion of the swirl blade that is closest to the main fuel injecting portion, the air flows straight in a substantially radially inward direction, and a swirling component of the air increases as a portion where the air flows becomes further away from the main fuel injecting portion.

8. A fuel injector comprising:
a pilot injector configured to spray fuel so as to form a first combustion region in a combustion chamber;
a main injector provided coaxially with the pilot injector so as to surround the pilot injector and configured to supply a fuel-air mixture that is a mixture of the fuel and air to form a second combustion region in the combustion chamber; and
an annular dividing wall configured to define a boundary between the pilot injector and the main injector, wherein:
the main injector includes: a first inflow channel configured to take the air therethrough and give the air a major flow component in an axial direction; a second inflow channel configured to take the air therethrough, give the air a major flow component in a radial direction, and cause the air therein to meet the air from the first inflow channel; and a main fuel injecting portion configured to inject the fuel only to the second inflow channel;
a first swirling unit and a second swirling unit are respectively attached to an entrance of the first inflow channel and an entrance of the second inflow channel;
the second swirling unit includes a plurality of swirling portions, the swirling portion located closest to the main fuel injecting portion causes inflow air to flow straight in a substantially radially inward direction, and the remaining swirling portions give a swirl velocity component to inflow air;
a position of an exit end of the pilot injector is upstream of a position of an exit end of the main injector in the axial direction; and
the exit end of the pilot injector is an exit end of the annular dividing wall.

9. A fuel injector comprising:
a pilot injector configured to spray fuel so as to form a first combustion region in a combustion chamber; and
a main injector provided coaxially with the pilot injector so as to surround the pilot injector and configured to supply a fuel-air mixture that is a mixture of the fuel and air to form a second combustion region in the combustion chamber, wherein:
the main injector includes:
  a first inflow channel configured to take the air therethrough and give the air a major flow component in an axial direction;
  a second inflow channel configured to take the air therethrough and give the air a major flow component in a radial direction;
  a premixing chamber located downstream of the first inflow channel and the second inflow channel such that the air from the first inflow channel and the air from the second inflow channel meet in the premixing chamber; and
  a main fuel injecting portion configured to inject the fuel only to the second inflow channel;
the first inflow channel supplies to the premixing chamber the air having the major flow component in the axial direction;
the second inflow channel supplies to the premixing chamber the air having the major flow component in a direction from a radially outer side toward a radially inner side;
the fuel injector further comprises an annular dividing wall configured to define a boundary between the pilot injector and the main injector; and
virtual extended inner peripheral surface extending from an exit end of an inner peripheral surface of the annular dividing wall in a downstream direction and a virtual extended outer peripheral surface extending from an exit end of an outer peripheral surface of the annular dividing wall in the downstream direction gradually separate from each other as the virtual extended inner peripheral surface and the virtual extended outer peripheral surface extend in the downstream direction.

10. A fuel injector comprising:
a pilot injector configured to spray fuel so as to form a first combustion region in a combustion chamber; and
a main injector provided coaxially with the pilot injector so as to surround the pilot injector and configured to supply a fuel-air mixture that is a mixture of the fuel and air to form a second combustion region in the combustion chamber, wherein:
the main injector includes: a first inflow channel configured to take the air therethrough and give the air a major flow component in an axial direction; a second inflow channel configured to take the air therethrough, give the air a major flow component in a radial direction, and cause the air therein to meet the air from the first inflow channel; and a main fuel injecting portion configured to inject the fuel only to the second inflow channel;
a first swirling unit and a second swirling unit are respectively attached to an entrance of the first inflow channel and an entrance of the second inflow channel;
the second swirling unit includes a plurality of swirling portions, the swirling portion located closest to the main fuel injecting portion causes inflow air to flow straight in a substantially radially inward direction, and the remaining swirling portions give a swirl velocity component to inflow air;
the fuel injector further comprises an annular dividing wall configured to define a boundary between the pilot injector and the main injector; and
a virtual extended inner peripheral surface extending from an exit end of an inner peripheral surface of the annular dividing wall in a downstream direction and a virtual extended outer peripheral surface extending from an exit end of an outer peripheral surface of the annular dividing wall in the downstream direction gradually separate from each other as the virtual extended inner peripheral surface and the virtual extended outer peripheral surface extend in the downstream direction.

* * * * *